United States Patent [19]
Ito et al.

[11] Patent Number: 5,612,720
[45] Date of Patent: *Mar. 18, 1997

[54] SYSTEMS FOR PROCESSING INFORMATION AND IDENTIFYING INDIVIDUAL

[75] Inventors: Jun Ito; Hiroyuki Kumai, both of Yokohama; Yasumasa Matsuda; Akira Nakajima, both of Tokyo; Yoshiisa Inoue, Fujisawa; Hiroyuki Koreeda, Yokohama; Shigeto Oheda, Kamakura, all of Japan

[73] Assignee: Hitachi Ltd., Tokyo, Japan

[*] Notice: The term of this patent shall not extend beyond the expiration date of Pat. No. 5,453,762.

[21] Appl. No.: 480,381

[22] Filed: Jun. 7, 1995

Related U.S. Application Data

[63] Continuation of Ser. No. 180,999, Jan. 14, 1994, Pat. No. 5,453,762.

[30] Foreign Application Priority Data

Jan. 20, 1993 [JP] Japan ................................ 5-007802
Jan. 28, 1993 [JP] Japan ................................ 5-012823

[51] Int. Cl.⁶ .................................................. G09G 3/02
[52] U.S. Cl. .......................... 345/179; 345/211; 178/18
[58] Field of Search .................................. 345/179, 180, 345/173, 211; 178/18, 19; 382/187, 189

[56] References Cited

U.S. PATENT DOCUMENTS

| | | | |
|---|---|---|---|
| 4,856,077 | 8/1989 | Rothfjell | 345/179 |
| 5,007,085 | 4/1991 | Greanias et al. | 345/180 |
| 5,149,919 | 9/1992 | Greanias et al. | 345/179 |
| 5,194,852 | 3/1993 | More et al. | 345/182 |
| 5,202,930 | 4/1993 | Livshitz et al. | 382/3 |
| 5,260,697 | 11/1993 | Barrett et al. | 345/173 |
| 5,294,792 | 3/1994 | Lewis et al. | 345/180 |
| 5,478,976 | 12/1995 | Kano | 178/19 |
| 5,491,495 | 2/1996 | Ward et al. | 345/173 |
| 5,526,023 | 6/1996 | Sugimoto et al. | 345/179 |
| 5,528,743 | 6/1996 | Tou et al. | 345/179 |
| 5,554,827 | 9/1996 | Oda | 345/179 |

FOREIGN PATENT DOCUMENTS

| | | |
|---|---|---|
| 56-90335 | 7/1981 | Japan . |
| 58-153484 | 9/1983 | Japan ................ 340/825.72 |
| 60-134328 | 7/1985 | Japan . |
| 63-106032 | 5/1988 | Japan . |
| 63-223815 | 9/1988 | Japan . |
| 2-292617 | 12/1990 | Japan . |

OTHER PUBLICATIONS

IBM Technical Disclosure Bulletin, "Memory Mouse", Jul. 1994, pp. 1 to 2.

Primary Examiner—Richard Hjerpe
Assistant Examiner—Amare Mengistu
Attorney, Agent, or Firm—Evenson, McKeown, Edwards & Lenahan, P.L.L.C.

[57] ABSTRACT

A system for processing information with an electronic pen includes a coordinates indicating device and a coordinates sensing device. Both of the devices serves to output the information stored in itself to each other and store the information outputted from the other. The power supply for driving the information processing system itself is fed by a battery built in the coordinates indicating device.

24 Claims, 12 Drawing Sheets

| 301 | 302 | 303 | 304 |
|---|---|---|---|
| PEN IDENTIFIER | INFORMATION CLASSIFYING CODE | INDIVIDUAL INFORMATION | LAST UPDATE |
| 00000 | DOCUMENT 031 | INDIVIDUAL INFORMATION OF PEN 00000 | 10:00 JAN. 15, 1992 |
| 00001 | DOCUMENT 009 | INDIVIDUAL INFORMATION OF PEN 00001 | 19:15 FEB. 14, 1992 |
| 00001 | CHARACTERISTIC CHARACTER DATA | INDIVIDUAL INFORMATION OF PEN 00001 | 12:45 NOV. 20, 1991 |
| 00002 | DOCUMENT 210 | INDIVIDUAL INFORMATION OF PEN 00002 | 11:45 AUG. 20, 1992 |
|  |  |  |  |

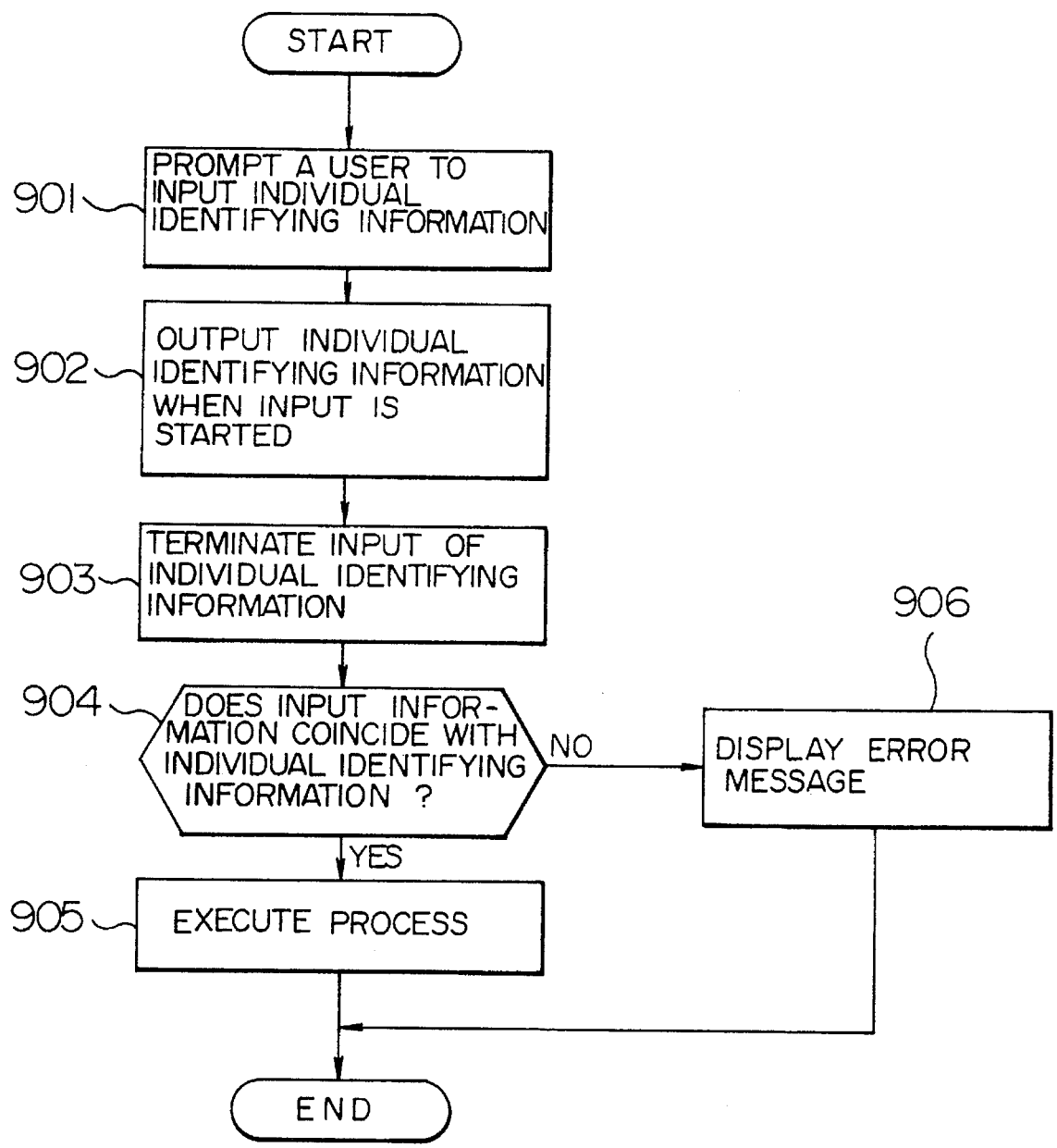

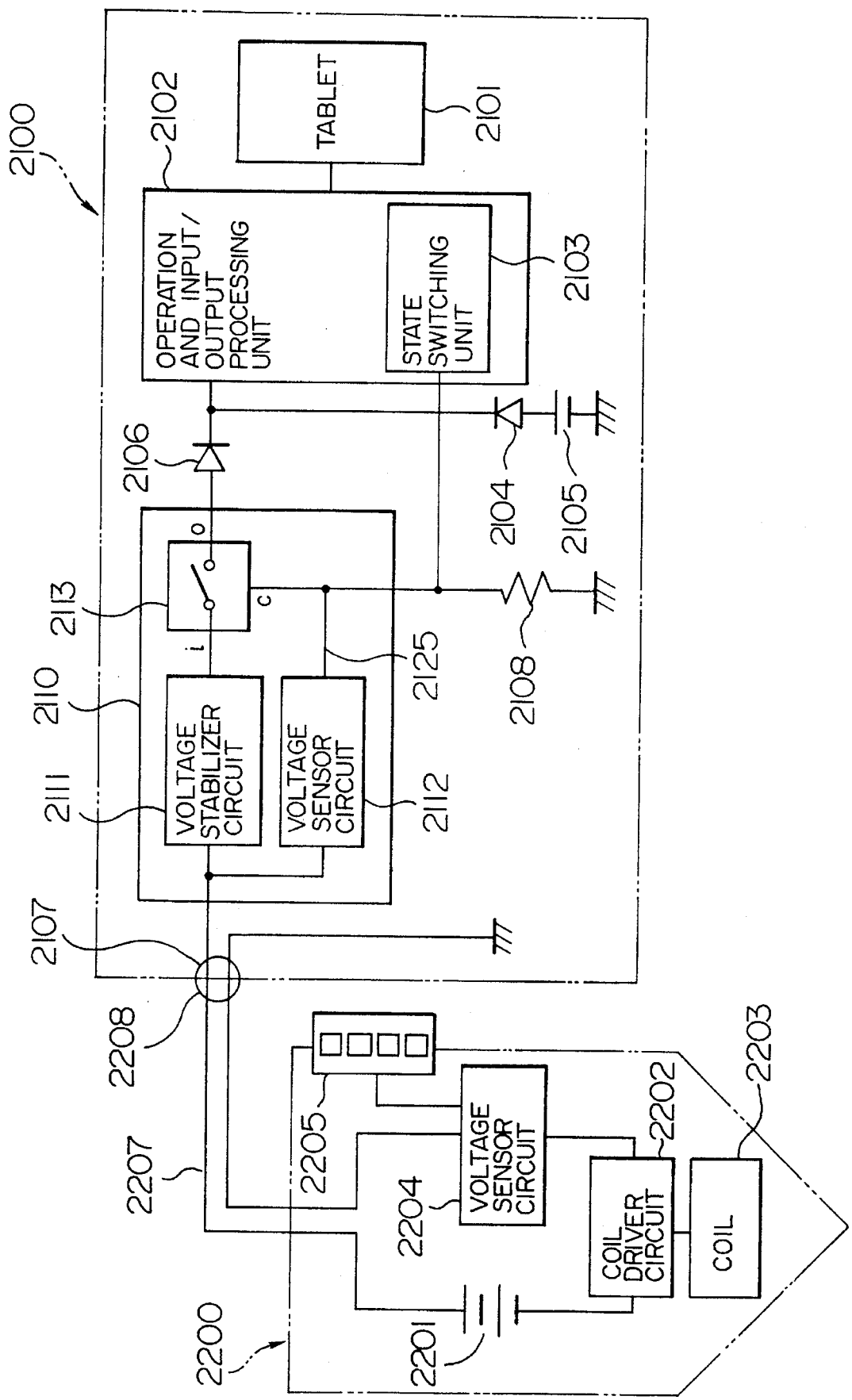

SYSTEMS FOR PROCESSING INFORMATION AND IDENTIFYING INDIVIDUAL

This is a continuation of application Ser. No. 08/180,999, filed Jan. 14, 1994, U.S. Pat. No. 5,453,762.

BACKGROUND OF THE INVENTION

The present invention relates to a system for processing information which system is arranged to use a coordinates indicating device or a coordinates sensing device, representatively, an electronic pen.

A handwriting device provided with an electronic pen for writing, in general, is composed of a main unit having a tablet integrated with a display and an electronic pen for indicating any point of coordinates. The main unit provides a dictionary for recognizing handwritten characters stored therein. The handwriting device performs such a process of recognizing a handwritten character that the main unit may compare an actual character pattern handwritten with the electronic pen with a reference handwriting pattern for converting the actually handwritten character into the corresponding character code.

However, each user has his or her own handwriting pattern. Hence, even if the user handwrites a specific character on the display, the handwritten character may greatly differ from the reference handwriting pattern registered in the dictionary for recognizing the handwritten characters. In this case, the character actually handwritten by the user may not be converted into the corresponding character code. As its cause, the user may handwrite the character along the incorrect route or the character in the cursive style. That is, since each user has his or her own handwriting habit, the character recognizing ratio is limited in the case of using only the common dictionary for recognizing handwritten characters.

To solve this shortcoming, as disclosed in the JP-A-56-90335, JP-A-60-134328, JP-A-63-106032, and JP-A-2-292617, there has been known a method of storing a specific handwriting pattern to each user (referred to as characteristic character data) as different individual (personal) information from the reference handwriting patterns in a storage unit provided in the main unit and switching to the characteristic character data by entering a proper ID code when the user handwrites a character, for enhancing a character recognition ratio.

As a further method, it is possible to refer to a method of holding individual information in an external storage medium such as an IC card or a floppy disk and setting the external storage medium holding the individual information by the user himself, for enhancing a character recognition ratio.

As another method, as disclosed in JP-A-63-223815, the information such as characters or graphics inputted to the main unit by the user is temporarily stored in the storage unit inside of the electronic pen, though the information is held in an external storage medium holding the individual information or another external storage medium.

As described above, these prior arts require a user himself to input an ID code or set the external storage medium holding the individual information to the main unit. They disadvantageously have an additional handling step.

Further, in the case of using the external storage medium, after the use of the medium is finished, these prior arts further require the user to remove the external storage medium. For example, consider the case where a user handles the main units located in several places. The user needs to take the steps of (1) setting the external storage medium, (2) holding the electronic pen for handwriting, and (3) removing the external storage medium. These prior arts have a disadvantage that the user cannot use another main unit if he forgets to remove the external storage medium. In particular, in the case of doing a handwriting input with an ATM terminal used by a non-specific ordinary user, the handwriting input does not work well, because many users are not accustomed to the machine.

Moreover, two or more pieces of individual information are not allowed to be in use substantially at a time. Hence, two or more users cannot do a handwriting input substantially at a time. This is also a disadvantage.

The handwriting devices having described above have a capability of displaying and inputting a character without a keyboard or a CRT (Cathode-Ray Tube). These devices, therefore, are fitted to the portable use. The portable use means that it is difficult to secure a commercial power supply. The conventional handwriting device, hence, entail the battery for operating the function. In this case, the battery is built in the device itself or held in the storage space prepared therefor.

To reduce the device in size, the size of the battery is an obstacle to making the device thinner. To make the battery replaceable, a battery case or a battery contact has to provide a mechanism for enduring a mechanical stress imposed in replacing the batteries with each other. This mechanism is also an obstacle to making the device smaller and thinner.

SUMMARY OF THE INVENTION

It is a first object of the present invention to provide a system for processing information which allows two or more uses to do handwriting inputs substantially at one time and at a high character recognition ratio without having to add a specific step.

It is a second object of the present invention to provide a handwriting device which is made smaller, thinner and more portable than the related prior arts.

In carrying out the first object, the information processing system according to the present invention provides a coordinates indicating device and a coordinates sensing device arranged to output the information stored in themselves to each other and store the information outputted from each other.

The coordinates indicating device stores the processed result outputted from the coordinates sensing device, that is, the characteristic character data, as individual information. The coordinates sensing device stores a common dictionary for recognizing handwritten characters. The coordinates indicating device operates to output the characteristic character data stored in itself so that the coordinates sensing device may recognize any handwritten character by using the characteristic character data and the dictionary for recognizing handwritten characters.

The coordinates indicating device may be arranged to store the processed result outputted by the coordinates sensing device, that is, the document data as the individual information. In this case, the coordinates indicating device enables to output the document data stored in itself so that the coordinates sensing device may edit the document data.

The user, therefore, can enjoy the similar operating environment even if any coordinates sensing device is used.

Further, each coordinates indicating device may be arranged to store a device identifier added to the coordinates indicating device. In this case, the coordinates indicating device enables to output the device identifier stored in itself and the characteristic character data, so that the coordinates sensing device may identify the coordinates indicating device. That is, the coordinates sensing device can identify the characteristic character data outputted from the coordinates indicating device.

Hence, two or more users can keep a high character recognition ratio if they use one coordinates sensing device substantially at one time.

Moreover, the coordinates sensing device may be arranged to store a pair of a device identifier of the coordinates indicating device and a piece of individual information, the individual information having an identifier of the processed result added to thereto and the updated history information. In this case, the coordinates sensing device enables to store two or more pieces of individual information for one coordinates sensing device by referring to the identifier of the processed result. The coordinates indicating device and the coordinates sensing device enable to store the individual information outputted from each other if necessary by referring to the updated history information.

In carrying out the second object, the information processing system according to the present invention enables to do a power supply for driving the information processing system with a battery built in the coordinates indicating device.

Concretely, the coordinates indicating device is arranged to provide a battery for driving the information processing system. This battery may be replaceable or integrally molded with the coordinates indicating device if it is not replaceable. Further, the used battery may be chargeable or nonchargeable.

At the same time, the coordinates indicating device is arranged to provide battery voltage sensing device for sensing a voltage of a battery, battery voltage displaying device for displaying the sensed result, and a code for transmitting the power of the battery to the information processing system.

The information processing system provides a code connection for connecting a code and device for conveying a transmitted power to a power supply circuit for driving the main unit.

Moreover, the information processing system according to the present invention prepares two states of a waiting state where the processing is interrupted and the power consumption is suppressed as keeping the content of the memory of the device and the operative state and provides an auxiliary power supply for feeding a power in the waiting state for keeping the state. Further, state control unit is provided for putting the information processing system-into the waiting state when a power feed of the battery built in the coordinates indicating device is stopped or the fed voltage departs from the operative range of the information processing system or putting the information processing system into the operative state when the power feed from the battery built in the coordinating device to the power supply circuit for driving the main unit is started.

According to the present invention, in order to achieve the second object, it is possible to use the battery provided in the coordinates indicating device for achieving the first object.

In this system, if two or more users use the same main unit, when each user enters the data with his or her own electronic pen, the characteristic character data is automatically switched in recognizing the character. This results in enhancing the character recognition ratio.

In a case that the CPU cannot obtain the characteristic character data corresponding to the received pen identifier, the characteristic character data is copied from the electronic pen to the main unit.

Even in a case that two or more non-specific users use any one of the main units, when each user enters the data with his or her own electronic pen, the characteristic character data stored in the electronic pen is automatically used for the handwritten character recognition.

Further, when creation of the document data is terminated or the characteristic character data is updated, the document data or the characteristic character data is stored from the main unit to the electronic pen.

This operation makes it possible to expand the portability of the individual information stored in the electronic pen, improve the operativity of the electronic pen, remove the external storage medium from the main unit and reduce the main unit in size.

Further, since the electronic pen provides a battery, by connecting a code of the electronic pen to the code connector of the main unit by the user's hands, the power is fed to the power supply circuit for driving the main unit, provided in the power unit. The state control unit serves to switch the state of the information processing system to the operative state. Then, the main unit starts the operation following the waiting state.

By removing the code of the electronic pen from the code connector by the user's hands, the power feed from the information processing system to the power supply circuit for driving the main unit is stopped, when the state control unit serves to switch the state of the information processing system to the waiting state. With the switching, the information processing system stops the processing at keeping the content of the memory and the operative state.

When connecting the code connector to the code of the electronic pen next time, therefore, the operation is restarted from the state where the code is removed. Further, if the battery built in the pen is exhausted, the main unit operates similarly with the case that the state control unit disconnects the code of the electronic pen from the code connector. That is, the information processing system is put into the waiting state.

The voltage of the battery inside of the electronic pen is sensed by the battery voltage sensing device and the sensed result is displayed on the battery voltage display device. The user can know how the battery is consumed based on the output of the battery voltage display device.

BRIEF DESCRIPTION OF THE DRAWINGS

FIG. 9 is a flowchart showing an operation of the system for identifying an individual shown in FIG. 8;

FIG. 16 is an explanatory view showing an internal arrangement of the information processing system according to the third embodiment of the present invention.

DESCRIPTION OF THE PREFERRED EMBODIMENTS

Hereafter, an embodiment of the present invention will be discussed with reference to the drawings.

At first, the description will be oriented to a first embodiment of the present invention.

Figures 2, 3:
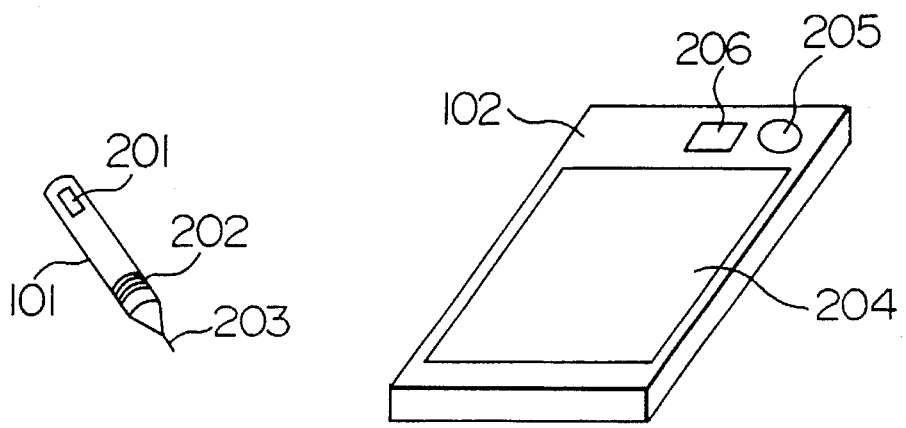
FIG. 2 is a view showing an outer appearance of the handwriting device according to the first embodiment of the present invention.
FIG. 3 is a view showing a structure of a pen identifier/individual information table included in the first embodiment of the present invention.

FIG. 2 shows an outer appearance of a handwriting device according to this embodiment of the invention.

The handwriting device according to this embodiment is arranged to have an electronic pen 101 with which any character is handwritten or any kind of indication is entered and a main unit 102 which receives data from the electronic pen 101 and displays the operated result.

The electronic pen 101 provides a power switch 201 for switching the pen 101 itself on and off, a data I/O unit 202 using an infrared ray, and a pen tip switch 203 for sensing a pen-up or a pen-down state at the tip of the pen 101. The main unit 203 provides a tablet 204 integrally provided with the display, a power switch 205 for switching the main unit 102, and a data I/O unit 206 using an infrared ray.

According to this embodiment, an infrared ray is used as a medium for doing communication between the electronic pen 101 and the main unit 102. However, the medium is not limited to the infrared ray.

Further, the electronic pen 101 is not necessarily formed as shown in FIG. 2 but may provide a coordinates indicating unit for entering data to the main unit 102. For example, the electronic pen 101 may be formed like a card or a square. In actual, it may be formed in various forms. The main unit 102 is not necessarily formed as shown in FIG. 2 but may just sense a point of coordinates to be inputted with the electronic pen 101.

The pen tip switch 203 operates to synchronize the communication between the electronic pen 101 and the main unit 102 or switch on and off the power supply of the electronic pen 101. The pen tip switch 203 is not necessarily provided only if the asynchronous communication is done and the power supply is controlled based on the time out.

The power supply switch 205 may be removed if the power is composed of a solar cell, a combination of a generator mechanism and a cell or is fed from the external.

The handwriting device according to this embodiment is intended to recognize a handwritten character at a high character recognition ratio for each user, however peculiar the handwritten character may be. Further, the handwriting device operates to inhibit erroneous recognition if two or more users handwrite characters on the same main unit 102 substantially at one time. Further, the user can use two or more main units 102 according to a simple procedure.

According to this embodiment, that is, the electronic pen 101 enables to store the characteristic character data of the user, the document data, and the applied program used by the user as individual information. The individual information can be copied from the electronic pen 101 to the main unit or, conversely, can be stored from the main unit 102 to the electronic pen 101.

Figure 1:
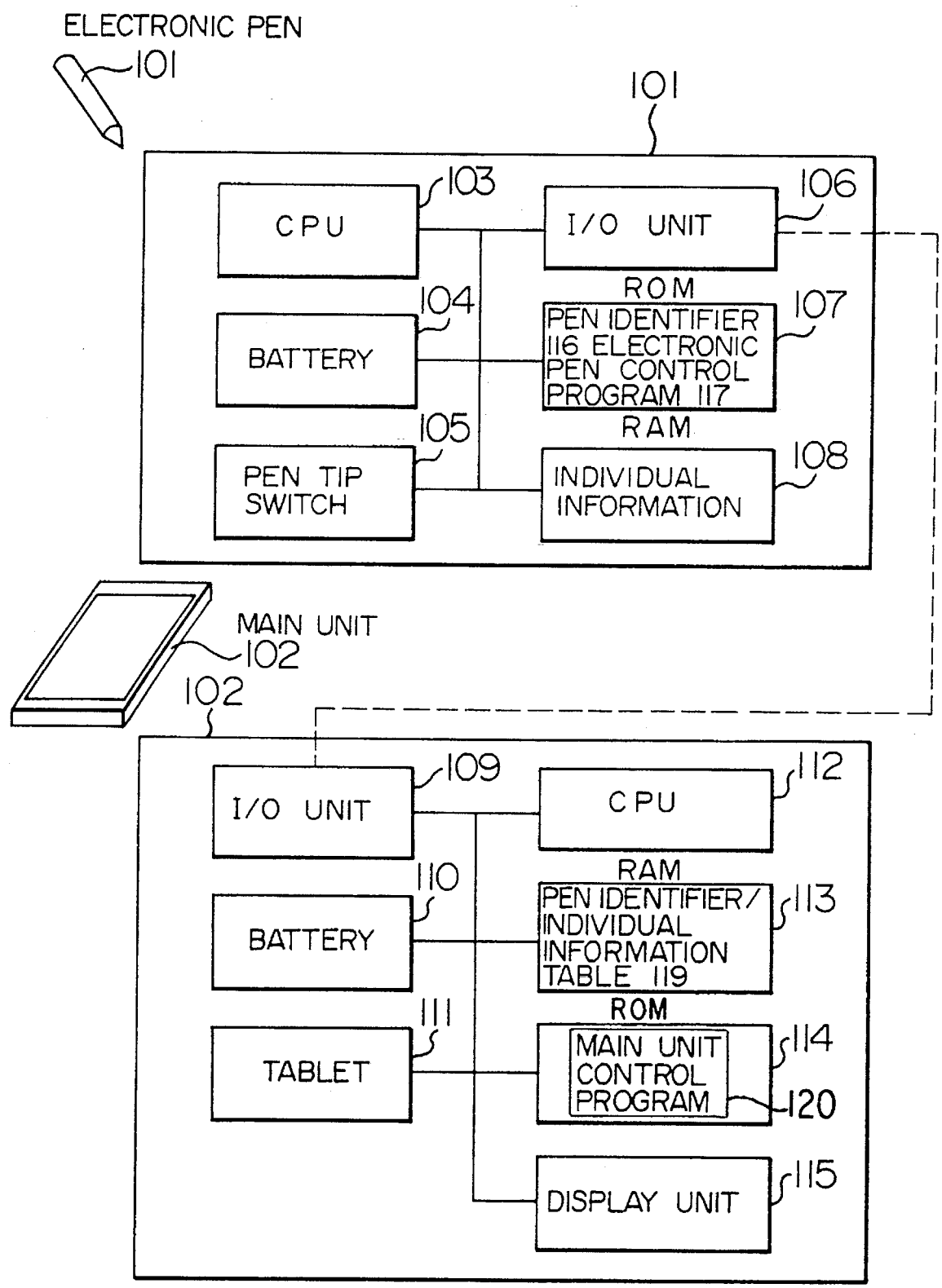
FIG. 1 is a fundamental block diagram showing a handwriting device according to a first embodiment of the present invention.

FIG. 1 is a fundamental block diagram showing this embodiment.

At first, the arrangement of the electronic pen 101 will be described below.

In FIG. 1, a numeral 103 denotes a CPU for controlling the electronic pen 101, A numeral 104 denotes a power supply (battery) for feeding power to the electronic pen 101. A numeral 105 denotes a pen tip switch provided at the tip of the pen 101 and for sensing whether or not the electronic pen 101 is in the pen-down state. A numeral 106 denotes an I/O unit using an infrared ray and for doing an I/O of a control code or individual information.

According to this embodiment, the electronic wire 101 is connected with the main unit 101 wirelessly. In place, one or more electronic pens 101 may be connected with one or more main units 102 through one or more cables.

Further, a numeral 107 denotes a ROM, which stores a pen identifier 116 and an electronic pen control program 117 which are specific to each electronic pen 101.

According to this embodiment, a pen identifier 116 is composed of a 2-byte code so that any code among "00000" to "65535" may be allocated in a manner to give all the electronic pens 101 respective pen identifiers 116. By expanding the length of the identifier code, more electronic pens 101 are allowed to be identified.

A numeral 108 denotes a RAM, which stores the characteristic character data of each user, the document data created by the user, and the applied program used by the user as individual information 118. In addition to the characteristic character data, the document data and the applied data, the individual information 118 contains an information classifying code for distinguishing them from one another and a last update time for updating these data at the last time.

According to the present embodiment, the pen identifier 116 is proper to the electronic pen 101 and may be stored in the ROM 107 in order to avoid erroneous rewriting. In place, it may be stored in the RAM 108. To secure more storage volume, in place of the RAM 108, another storage unit like a small-sized harddisk may be used. To reduce the electronic pen 101 in size, it is better to form those electronic components in circular, elliptical, polygonal or fanlike section in order to fit the components to the outer case of the electronic pen 101.

Next, the description will be oriented to an arrangement of the main unit 102.

In FIG. 1, a numeral 112 denotes a CPU for controlling the main unit 102. A numeral 110 denotes a power supply (battery or A/C power supply) of the main unit 102. A numeral 111 denotes a tablet on which an input is indicated. A numeral 115 denotes a LCD display unit. The tablet 111 is integrally connected with the display unit 115 so as to display the indicated data at the location corresponding to the inputted coordinates.

Further, a numeral 109 denotes an I/O unit using an infrared ray and for taking an I/O of a control code and individual information with the electronic pen 101. A numeral 113 denotes a RAM for storing the data generated under execution of the process and a table 119 formed by a combination of the pen identifier and the individual information (referred to as a pen identifier/individual information table). To make effective use of the RAM 108, the common information to any of the electronic pens 101 is stored in the RAM 113 of the main unit 102 and the proper information to each of the electronic pens 101 is stored in the RAM 108 of the electronic pen 101.

A numeral 114 denotes a ROM for storing a character recognition program and a program 120 for controlling the main unit 102. The pen 101 and the main unit 102 mutually give and take information via the respective I/O units 106 and 109.

FIG. 3 is a view showing a data structure of the pen identifier/individual information table 119 stored in the RAM 113 of the main unit 102.

As shown in FIG. 3, in the pen identifier/individual information table 119, one record is composed of a pen identifier 301, an information classifying code 302, individual information 303, and a last update time 304, which means the last update day and time of the individual information 303. The record is provided at each information unit (file). If the information contains the same pen identifier 301 but a different information classifying code 302, it is stored as another record.

The information classifying code 302 is used for classifying the individual information 303. Concretely, it includes "characteristic character data", "document data" and "applied program". The last update time 304 is provided for deleting the previous individual information 303 from the pen identifier/individual information table 119 if the volume of the individual information 303 exceeds the critical volume of the table 110 and storing the new individual information 303.

Under the below-described program 120 for controlling the main unit, the pen identifier 116 and the individual information 118 outputted from the electronic pen 101 are stored in the pen identifier/individual information table 119.

Next, the description will be oriented to the program 117 for controlling the electronic pen.

Figure 4:
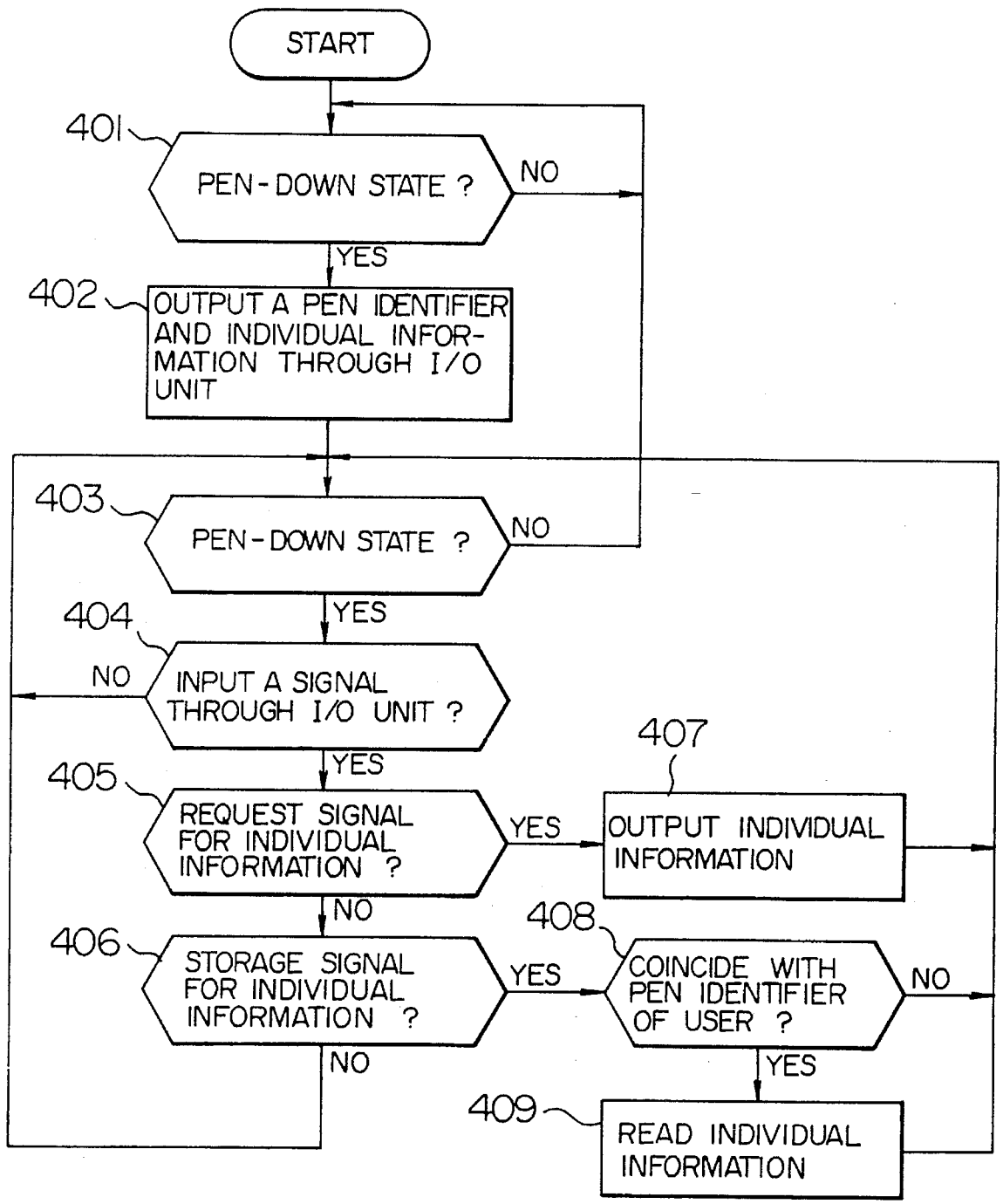
FIG. 4 is a flowchart showing a program for controlling an electronic pen provided in the first embodiment of the present invention.

FIG. 4 is a flowchart showing the program 117 stored in the ROM 107 of the electronic pen 101.

The program 117 for controlling the electronic pen is started by switching on the power switch 201 of the electronic pen 101. When it is started, the program 117 serves to determine whether or not the pen tip switch 105 is in the pen-down state (step 401). If not, the program 117 enters into the waiting state. In the waiting state, the operating speed of the electronic pen 101 is made lower so as to put the pen 101 into a power-saving mode. At this mode, the power consumption is allowed to be lowered.

If it is determined that the electronic pen 101 is in the pen-down state, the electronic pen 101 starts to output the pen identifier stored in the ROM 107, the information classifying code and the last update time of the individual information stored in the RAM 108 through the I/O unit 106 (step 402).

In succession, it is determined whether or not the electronic pen 101 is in the pen-down state (step 403), If so, the electronic pen 101 starts to determine whether or not the signal is inputted from the main unit 102 through the I/O unit 106 (step 404).

If it is determined that the signal is inputted, it is determined whether or not the signal is a signal for requesting the individual information (step 405). The individual information request signal is transmitted only if the pen identifier/individual information table 119 of the RAM 113 does not contain the information about the electronic pen 101. If the inputted sinal is determined to be the individual information request signal, the electronic pen 101 starts to select the information according to the information classifying code contained in the individual information request sinal from the individual information stored in the RAM 108 and output the information through the I/O unit 106.

If the inputted signal is not determined to be the signal for requesting the individual information, it is determined whether or not the signal is an individual information storage signal (step 406). The individual information storage signal is a signal transmitted by the main unit 102 if the information of the pen identifier/individual information table 119 is stored in the electronic pen 101. Then, if the inputted signal is determined to be the individual information storage signal, it is determined whether or not the pen identifier contained in the individual information storage signal is equal to the pen identifier stored in the ROM 107 (step 408). If both are not equal to each other, no information of the pen identifier/individual information table 119 is stored. With this operation, it is possible to prevent the information of the table 119 (document data, for example) from being automatically stored in the electronic pen 101 of another user located near itself. If it is determined that both are equal to each other, the information classifying code, the individual information, and the last update time inputted through the I/O unit 106 are stored in the RAM 106 (step 409). The storage of the last update time in the electronic pen 101 is executed, because the individual information stored in the electronic pen 101 is compared with the individual information stored in the main unit 102 with respect to the time. If the last update time of the electronic pen 101 is newer than the last update time of the main unit 102, it means that the individual information of the electronic pen 101 is updated by another main unit 102. At a time, the individual information is copied from the electronic pen 101 to the main unit 102.

The process from the steps 403 to 409 is repeated until the electronic pen 101 is pulled upward. On the termination of the pen-down state, the operation returns to the step 401, at which the program waits until the electronic pen 101 enters into the pen-down state.

Next, the description will be oriented to a program 120 for controlling the main unit 102.

Figure 5:
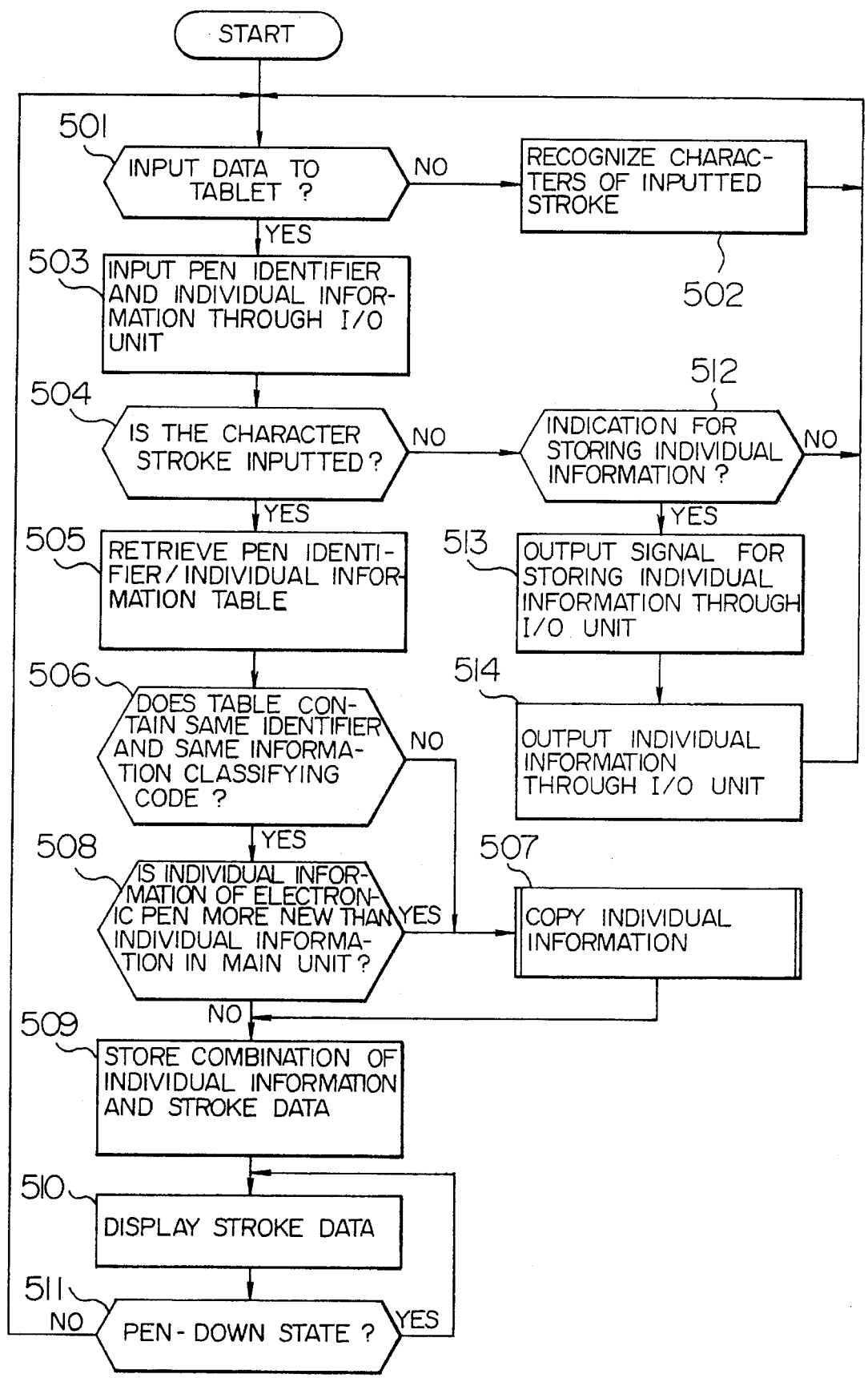
FIG. 5 is a flowchart showing a program for controlling a main unit provided in the first embodiment of the present invention.

FIG. 5 is a flowchart showing the program 120 stored in the ROM 114 of the main unit 102.

The program 120 for controlling the main unit is started when the power switch 205 of the main unit 202 is turned on. When it is started, the program 120 operates to determine whether or not the electronic pen 101 inputs data on the table 111 (step 501). If it is determined that no input is done, the characters contained in the inputted stroke are recognized (step 502). By the recognition, the character recognizing time is reduced. Or, the operating speed of the main unit is made lower so as to put the main unit to the power-saving mode, thereby lowering the power consumption of the main unit 102.

If it is determined that the electronic pen 101 inputs data onto the tablet 111, the main unit 101 receives the pen identifier, the information classifying code, and the last update time, the latter two of which are about the individual information, through the I/O unit 109 and temporarily stores them in the RAM 113 (step 503).

Then, it is determined that the data to be inputted to the electronic pen 101 is data of a character stroke (step 504). The determination is done on whether or not the coordinates of the indicated point stays inside of the pre-displayed character input area. If it is the data of a character stroke, the pen identifier temporarily pre-stored in the RAM 113 is retrieved from the pen identifier/individual information table 119 originally stored in the RAM 113 (step 505). Next, it is determined whether or not the inputted pen identifier is contained in the pen identifier/individual information table 119 and whether or not the record having the same information classifying code is contained in the table 119 (step 506). If not, the individual information stored in the electronic pen 101 is copied to the pen identifier/individual information table 119 (step 507). The process of copying the individual information at the step 507 will be described later.

As described abode, the individual information of the electronic pen 101 is automatically copied to the main unit 102 so as to make the characteristic character data, the document data and the applied program about the user now inputting data usable. Hence, the user can enjoy the similar operating environment in any of the main units 102.

On the determination at the step 506, even if the same pen identifier and the same information classifying code of the individual information are contained in the pen identifier/individual information table 119, in a case that the inputted last update time is newer than the last update time in the table 119 (step 508), it means that the individual information of the electronic pen 101 is updated by another main unit 102. Hence, the individual information is copied (step 507).

Conversely, in a case that the inputted last update time is older than the last update time in the table 119, it means that the individual information of the electronic pen 101 is initialized. Hence, no individual information is copied. Further, in a case that the inputted last update time is equal to the last update time in the table 119, it means that the individual information of the main unit 102 is used. Hence, no individual information is copied.

As noted above, the individual information is copied from the electronic pen 101 to the main unit in case of need. It means that the idle process of copying the individual information can be eliminated.

In succession, each stroke data or character is stored in the RAM 113 in a manner to correspond to the inputted pen identifier of the electronic pen 101 (step 509).

This makes it possible to switch the characteristic character data at each character when recognizing the stroke data in the process of recognizing the character. Hence, even if two or more users input characters on the same tablet 111 substantially at one time, the same character recognition ratio as that given when one user inputs data can be obtained. This function is effective in applying this system to a handwriting electronic blackboard, for example.

Then, the stroke data to be occasionally inputted is stored and displayed in the display unit 115 (step 510). The storage and display of the stroke data is executed until the tablet 111 is off the table 111 (step 511).

On the other hand, in the determination at the step 504, if it is determined that the inputted data is not stroke data, it is determined whether or not the data is the storage of the individual information storage indication signal (step 512). The determining criterion is whether or not the coordinates of the indicated point is inside of the pre-displayed individual information storage area (for example, realized as an icon). If it is determined that the signal is an individual information storage indication signal, the individual information storage signal containing the pen identifier (which is an identifier of the electronic pen indicating the storage of the individual information), temporarily pre-stored in the RAM 113, is outputted to the electronic pen 101 through the I/O unit 109 (step 513). Then, the last update times of all the updated files of the individual information of the main unit 102 are updated. Then, the information classifying code, the last update time and the individual information of all the updated files are outputted through the I/O unit 109 (step 514).

With this operation, for example, in a case that the document data is updated but the characteristic character data is not updated, only the updated document data is copied to the electronic pen 101 but the unchanged characteristic character data is not transmitted. Hence, the wasteful communicating cost can be eliminated.

Only if the individual information storage is indicated, the individual information is copied from the main unit 102 to the electronic pen 101. Each time it is determined that the electronic pen 101 is in the pen-up date, the individual information updated to now is copied from the main unit 102 to the electronic pen 101. The user can interrupt the input operation at any time so that the latest individual information can be constantly stored in the electronic pen 101.

Figure 6:
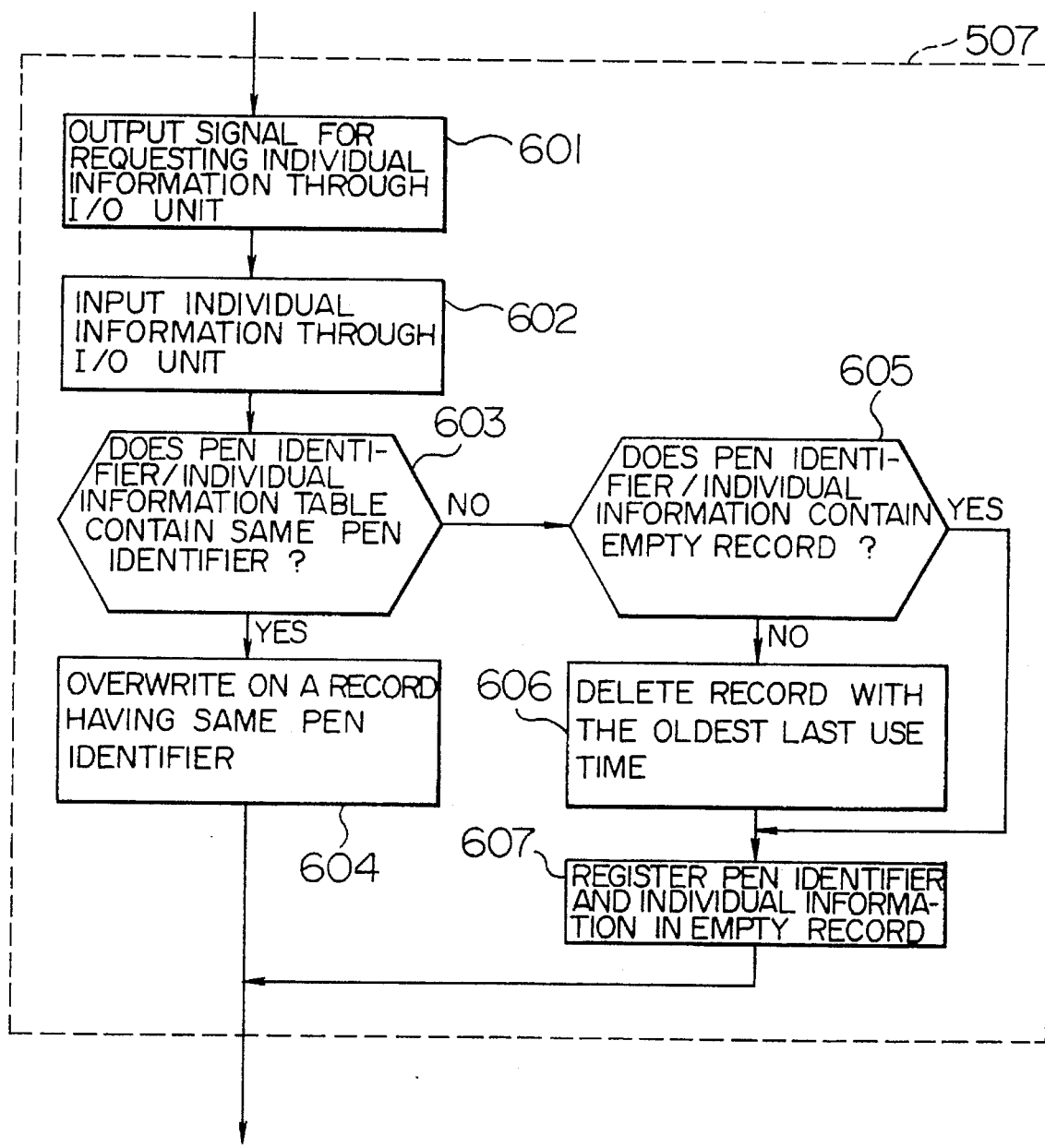
FIG. 6 is a flowchart showing a process of copying individual information provided in the first embodiment of the present invention.

Next, the description will be oriented to the process of copying the individual information at the step 507 with reference to FIG. 6.

At first, the signal for requesting the individual information containing the information classifying code is outputted through the I/O unit 109 (step 601). In the case of copying to the main unit 102 a specific file with the older last update time of the files stored in the RAM 108 of the electronic pen 101, the specific file is outputted together with the information classifying code. Then, the individual information outputted from the electronic pen 101 is received in the main unit 102 through the I/O unit 109. The individual information is temporarily stored in the RAM 113 (step 602).

In succession, it is determined whether or not there is provided in the pen identifier/individual information table 119 a record having the same pen identifier and the same information classifying code (step 603). If yes, it means that the data in the pen identifier/individual information table 119 is old, the pen identifier and the individual information temporarily pre-stored in the RAM 113 are written on the record (step 604).

If it is determined that there is provided no record having the same pen identifier and the same information classifying code, it is determined whether or not an empty record exists in the pen identifier/individual information table 119 (step 605). If no empty record is provided, the last update times of the records in the pen identifier/individual information table 119 are compared with each other. The oldest record is deleted and the empty record is secured (step 606). The pen identifier and the individual information temporarily stored in the RAM 113 are registered in the deleted record (step 607).

According to this embodiment, in the case of using the individual information of the electronic pen 101, the individual information of the electronic pen 101 is copied to the main unit 102. By directly accessing the RAM 108 of the electronic pen through the effect of communicating with the electronic pen 101, the RAM 113 of the main unit 02 is allowed to be reduced or effectively used.

As described above, this embodiment is arranged to store the individual information in the electronic pen 101, copy the individual information stored in the electronic pen 101 to the main unit 102 or give the individual information stored in the main unit 102 to the electronic pen 101. Hence, it is possible to recognize the handwritten characters at a high character recognition ratio according to the characteristic character data for each user. Further, if two or more users handwrite data on the same main unit substantially at the same time, it is possible to avoid the erroneous recognition. If the user uses any of the main units 102, the similar handling environment is allowed to be offered to the user.

According to the present embodiment, the characteristic character data, the document data and the applied program used by the user are stored in the electronic pen 101. In actual, the data to be stored is only the characteristic character data. In this case, when one user uses two or more main units 102, it is necessary to store the document data and the applied program in the external storage medium and set them to the used main unit 102. However, the information classifying code is not necessary.

Moreover, in the foregoing description, the characteristic character data, the document data and the applied data are contained in the individual information. In addition to them, it is possible to store as individual information saving data, address data, certificate data, schedule data or the like. With storage of such data, the main unit 102 may be used for various purposes in addition to creating and editing the document data.

Next, the method for creating the characteristic character data will be briefly described below.

The method for creating the characteristic character data is the same as the prior arts, except the respect that the data is stored in the electronic pen 101.

That is, at first, when the user indicates execution of registering the characteristic character, there are displayed the first character frame in which desired characters are inputted and the second character frame in which a calligraphic pattern of the user is inputted. The user inputs a desired character(s) in the first character frame through the effect of a Kana-Kanji converting function, inputs a preferable calligraphic pattern corresponding to the character(s) inputted in the first character frame and indicates the registration of the calligraphic pattern. In addition to the reference pattern, this function makes it possible to match the calligraphic pattern inputted in the second character frame to the character(s) inputted in the first character frame, thereby creating the characteristic character data. The prior arts are arranged to store the created characteristic character data in the main unit 102 or the external storage medium set to the main unit 102. This embodiment, on the other hand, is arranged to output the data from the main unit 102 to the electronic pen 101 and store it in the pen 101.

Figure 7A:
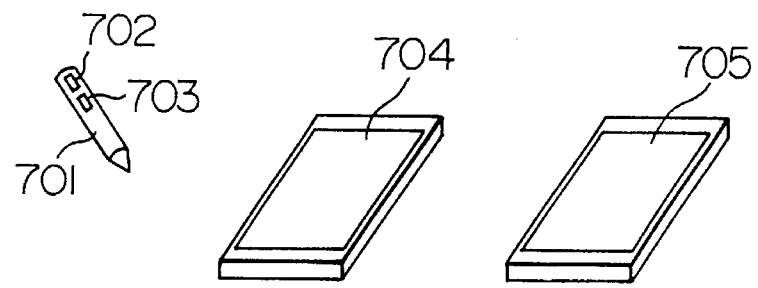
FIGS. 7A, 7B and 7C are explanatory views showing a configuration of an information processing system in which the handwriting device according to the first embodiment of the present invention is applied.
Figure 7B:
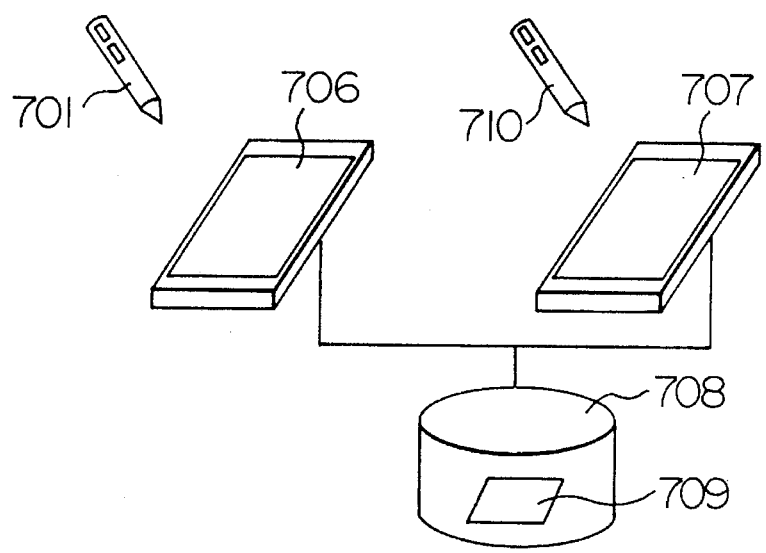
Figure 7C:
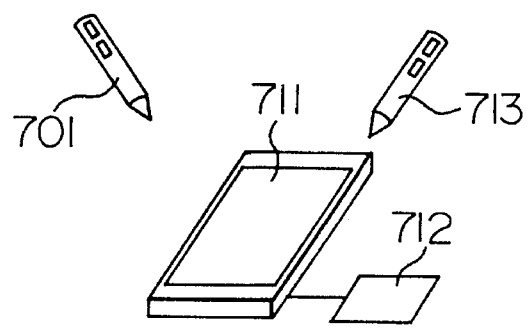

Hereafter, the description will be oriented to the configuration of the information processing system which makes use of the features of the handwriting device with reference to FIGS. 7A to 7C.

In FIG. 7A, a numeral 701 denotes an electronic pen. A numeral 702 denotes a pen identifier stored in the electronic pen 701. A numeral 703 denotes individual information stored in the electronic pen 701. Numerals 704 and 705 denote main units.

The user creates the document data by using the electronic pen 701 and the main unit 704 and the characteristic character data. At a time, the document data and the characteristic character data are stored as individual information 703 in response to an indication for storage given by a user. Next, the user with the electronic pen 701 moves to the main unit 705 and updates the document data with the main unit 705.

The prior arts are arranged to store the characteristic character data only in the main unit (for example, the main unit 704) constantly used by a user. Hence, if a different main unit (for example, the main unit 705) is used, the characteristic character data cannot be used. In this embodiment, however, the document data and the characteristic character data stored in the electronic pen 701 are automatically copied to the main unit 705. Hence, the created document data can be updated by using the copied characteristic character data. To update the document data, it is possible to use the applied program stored in the electronic pen 701. It means that the user can handle the system as keeping the handling environment uniform in any main unit.

In FIG. 7B, numerals 701 and 710 denote electronic pens. Numerals 706 and 707 denote main units. A numeral 708 denotes a center unit. A numeral 709 denotes a pen identifier/individual information table. The center unit is, for example, a server computer in a client server system.

The system arrangement shown in FIG. 7B operates to concentratively manage the individual information at the center unit 708. A user can create the document data by using the electronic pen 701 and the main unit 706 and store the data. At this time, the created document data is stored in the pen identifier/individual information table 709 of the center unit 708 in combination with the pen identifier. Next, the user with the electronic pen 701 moves to the main unit 707 and indicates to call the document data by using the main unit 707. When the user gives a calling indication to the main unit 707, the main unit 707 receives the pen identifier outputted from the electronic pen 701 and retrieves the individual information combined with the same pen identifier as the received pen identifier from the pen identifier/individual information table 709 for using the retrieved individual information. Thus, the document data and the characteristic character data created in the main unit 706 are allowed to be used even in the main unit 707.

When a user uses the main unit 706 with the electronic pen 701 and another user uses the main unit 707 with the electronic pen 710, it is possible to use the different characteristic character data as transferring the information between the main units 706 and 707 through the effect of the same applied communication program. Hence, the document data can be created in concert with two users. At this time, the document data created in concert with the users is registered in the pen identifier/individual information table 709 as a combination of all the pen identifiers of the electronic pen about the creation. Or, the created document data is registered in the individual information of all the users. Hence, the user can read the document data out of the main units later.

In FIG. 7C, numerals 710 and 713 denote electronic pens. A numeral 711 denotes a main unit. A numeral 712 dentes a pen identifier/individual information table.

FIG. 7C shows the use of one main unit with plural electronic pens. The electronic pens 701 and 713 have their own different pen identifiers. Each time a character stroke is inputted to the main unit 711, each pen identifier is outputted. At each time of inputting the character stroke, the main unit 711 stores the inputted stroke combined with the pen identifier in the pen identifier/individual information table 712. When doing the character recognizing process, for the character stroke inputted from the electronic pen 701, the individual information of the electronic pen 701 is used. For the character stroke inputted from the electronic pen 713, the individual information of the electronic pen 713 is used. As a result, if plural users use the same main unit 711 substantially at one time, the main unit 711 can be used as switching the characteristic character data for each of the users.

Next, the description will be oriented to a second embodiment of the present invention.

This embodiment makes it possible to configure a system for identifying an individual. That is, in this embodiment, in place of the individual information in the first embodiment, image data or stroke data of a signature or a reciting number is stored as information for identifying an individual in the electronic pen 101.

The outer appearance of the handwriting device according to this embodiment is the same as that shown in FIG. 2 according to this embodiment.

In the system according to this embodiment, a content of a ROM 107, a RAM 108 or a RAM 113 is different from that in the system shown in FIG. 1 according to the first embodiment. That is, in the first embodiment, the ROM 107 stores the pen identifier 116, while in this embodiment, the ROM 107 does not store the pen identifier 116. Further, in the first embodiment, the RAM 108 stores the individual information 118, while in this embodiment, the RAM 108 stores the information for identifying an individual in place of the individual information 118. Moreover, in the first embodiment, the RAM 113 stores the pen identifier/individual information table 119, while in this embodiment, the RAM 113 does not store the table 119.

Hereafter, the description will be oriented to the arrangement and the operation of the system for identifying an individual, which makes good use of the features of the handwriting device according to this embodiment.

Figure 8:
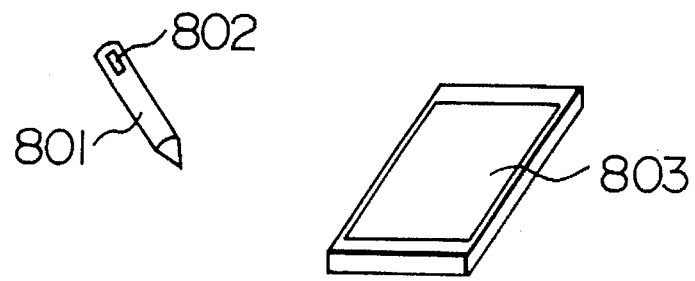
FIG. 8 is an explanatory view showing a configuration of a system for identifying an individual to which the handwriting device according to a second embodiment of the present invention is applied.

FIG. 8 shows the arrangement of the system for identifying an individual.

In FIG. 8, a numeral 801 denotes an electronic pen. A numeral 802 denotes individual identifying information stored in the electronic pen 801. A numeral 803 denotes a main unit.

FIG. 9 is a flowchart showing an operation of the system for identifying an individual as shown in FIG. 8.

At first, the system operates to prompt a user to input a signature or a reciting number by using the main unit 803 with the electronic pen 801 (step 901). This is done to display a guidance indicating the prompt to the main unit 803 or dictate the prompt.

When the input is started with the electronic pen 801, the individual identifying information 802 is outputted from the electronic pen 801 to the main unit 803 (step 902). When the user terminates inputting of a signature or a reciting number (step 903), the main unit 803 serves to compare the signature or the reciting number inputted with the electronic pen 801 with the individual identifying information outputted from the electronic pen 801 (step 904). If matched to each other, the processing is executed (step 905). If not matched, an error message is displayed (step 906) and the processing is terminated.

In the aforementioned arrangement, the individual identifying information 802 is stored in the electronic pen 801. In place, it may be stored in the main unit 803. In this case, the pen identifier is stored in the ROM 107 of the electronic pen 801 and a table composed of a combination of the pen identifier and the individual identifying information (referred to as a pen identifier/individual identifying information table or simply table) is stored in the RAM 113 of the main unit 803. In the determination at the step 804, a signature or a reciting number inputted with the electronic pen 801 is compared with the individual identifying information of the table, the information being combined with the pen identifier outputted from the electronic pen 801. The data structure of the pen identifier/individual identifying table is the same structure as the pen identifier/individual information table 119 shown in FIG. 3 except that the individual information 302 is replaced with the individual identifying information.

Furthermore, the aforementioned arrangement operates to output the individual identifying information 802 stored in the electronic pen 801 to the main unit 803 and compare the information 802 with the signature or the reciting number in the main unit 803. Conversely, the signature or the reciting number inputted with the electronic pen 801 is outputted to the electronic pen 801 in which it is compared with the information 802. In the latter case, the individual identifying information 802 stored in the electronic pen 801 is not outputted to the outside. This results in securing the safety.

Figure 10:
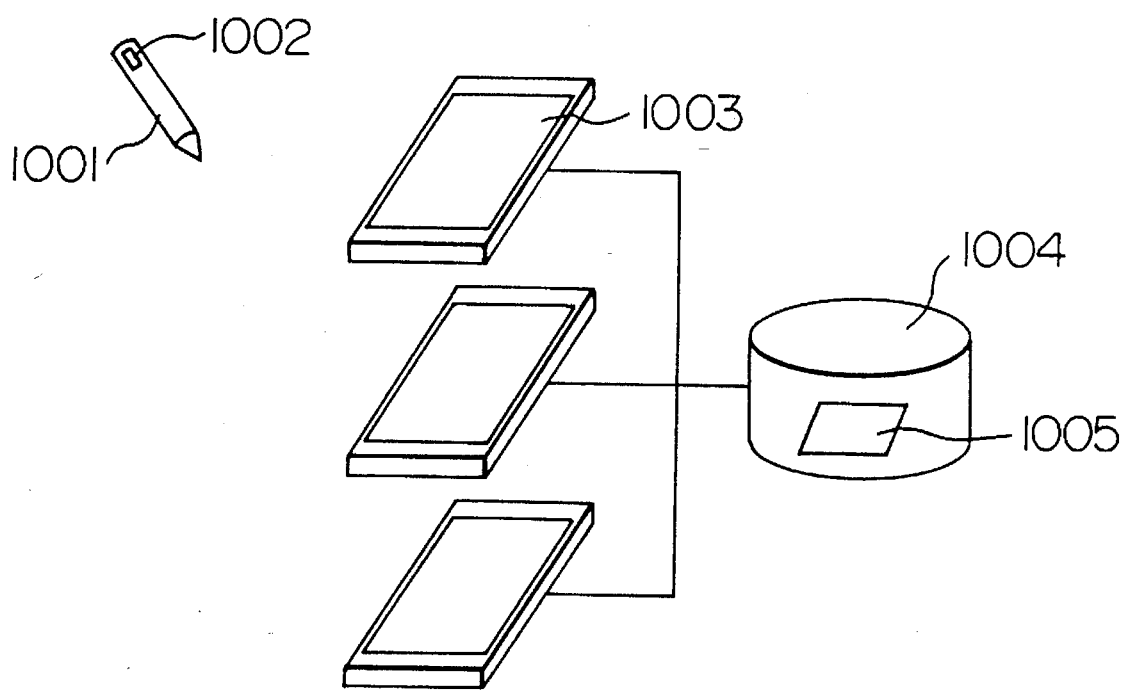
FIG. 10 is an explanatory view showing another configuration of the system for identifying an individual to which the handwriting device according to the second embodiment of the present invention.

FIG. 10 shows another arrangement of the system for identifying an individual, in which the individual identifying information is concentratively managed in the center unit.

In FIG. 10, a numeral 1001 denotes an electronic pen. A numeral 1002 denotes a pen identifier stored in the electronic pen. A numeral 1003 denotes a main unit. A numeral 1005 denotes a center unit. A numeral 1004 denotes a pen identifier/individual identifying information table.

The center unit 1004 may be a central computer placed in a headquarters of a bank. The main units 1003 may be placed at the cash dispensers in the branch offices of the bank.

Figure 11:
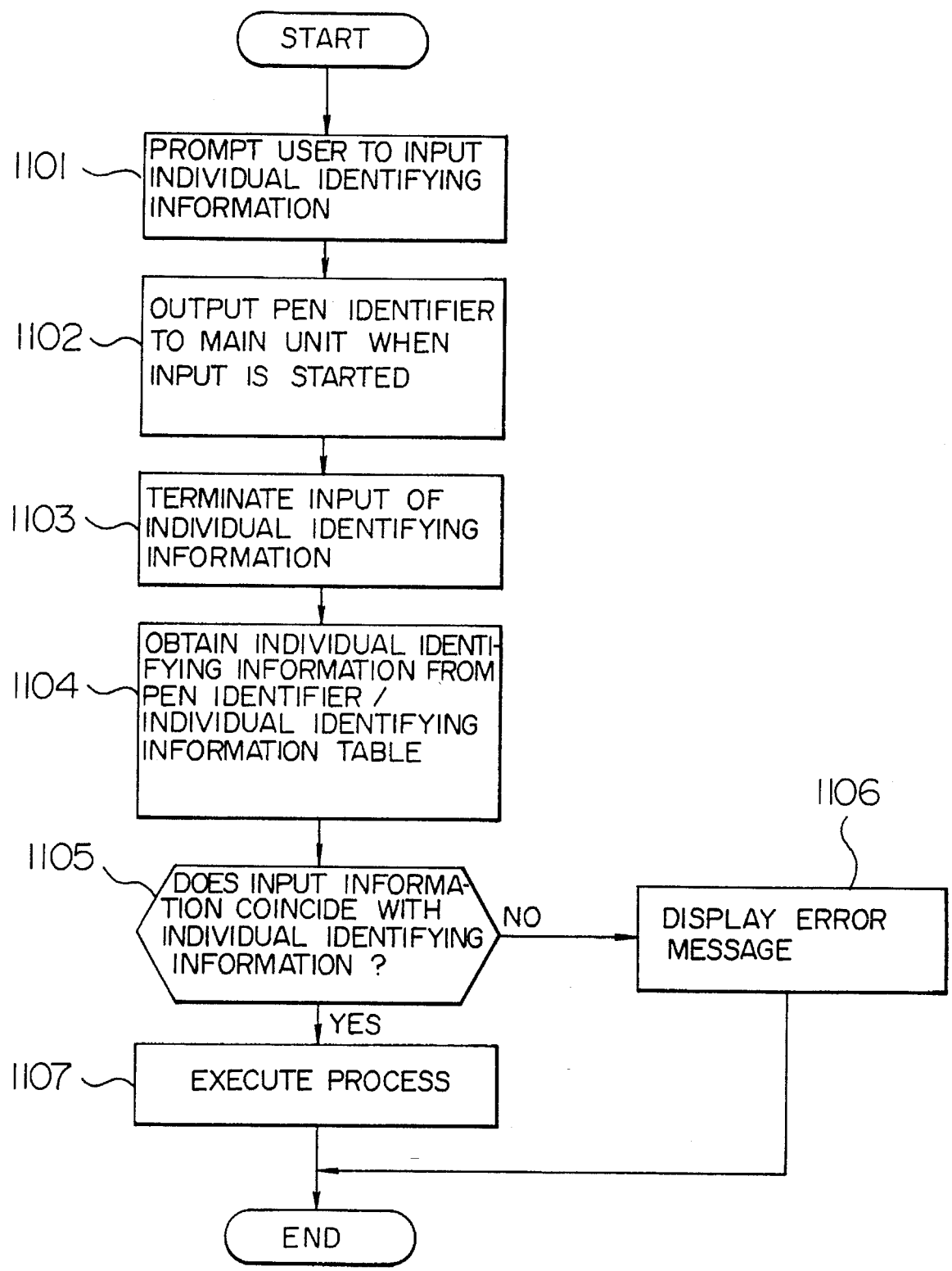
FIG. 11 is a flowchart showing an operation of the system for identifying an individual shown in FIG. 10.

FIG. 11 is a flowchart showing an operation of the system for identifying an individual as shown in FIG. 10.

At first, the system operates to prompt a user to input a signature or a reciting number by using the main unit 1003 with the electronic pen 1001 (step 1101). This is done to display a guidance indicating the prompt to the main unit 1003 or dictate the prompt.individual information.

When the input is started with the electronic pen 1001, the pen identifier 1002 is outputted from the electronic pen 1001 to the main unit 1003 (step 1102). When the user terminates inputting of a signature or a reciting number (step 1103), the main unit 1003 serves to retrieve and obtain the individual identifying information combined with the same pen identifier as the pen identifier 1002 outputted from the electronic pen 1001 from the pen identifier/individual identifying information table 1005 provided in the center unit 1005 (step 1104). The signature or the reciting number inputted with the electronic pen 1001 is compared with the obtained individual identifying information (step 904). If matched to each other, the processing is executed (step 1107). If not matched, an error message is displayed (step 1106) and the processing is terminated.

As described above, the system for identifying an individual according to the present embodiment makes it possible for a user to take only a step of inputting a signature or a reciting number for identifying an individual. Hence, it serves as the system for identifying an individual with a credit card or a cash card. For example, when a user holds the electronic pen in place of the credit card and do shopping with the electronic pen, he or she inputs a signature or a reciting number on the main unit with the electronic pen. Further, when a user holds the electronic pen in place of the cash card and draws some money from a bank, he or she inputs a signature or a reciting number on the main unit with the electronic pen. Apart from the case that a user inputs a reciting number by pressing some template keys, each user inputs his or her own signature. Hence, if the user loses the electronic pen, the pen is prevented from being ill-used by someone.

In this embodiment, if the volume of the individual identifying information exceeds the critical volume of the pen identifier/individual identifying information table, unlike the first embodiment, the old individual identifying information is not deleted from the pen identifier/individual identifying information, because this embodiment serves as the system for identifying an individual. In addition, not the user but the maintenance clerk of the system does the necessary operations of registering or updating the individual identifying information in the electronic pen.

Moreover, the system according to this embodiment is arranged to store only the individual identifying information in the electronic pen. In place, both of the individual information and the individual identifying information are allowed to be stored in the electronic pen. The individual identifying information serves to limit the main unit to be used by the user. In this case, after the determinations at the step 904 of FIG. 9 and the step 1105 of FIG. 11, the individual information stored in the electronic pen may be copied to the main unit.

In turn, the description will be oriented to a system for processing information according to a third embodiment of the present invention with reference to the drawings.

This embodiment is an arrangement of the system for processing information, powered by the electronic pen.

Figure 12:
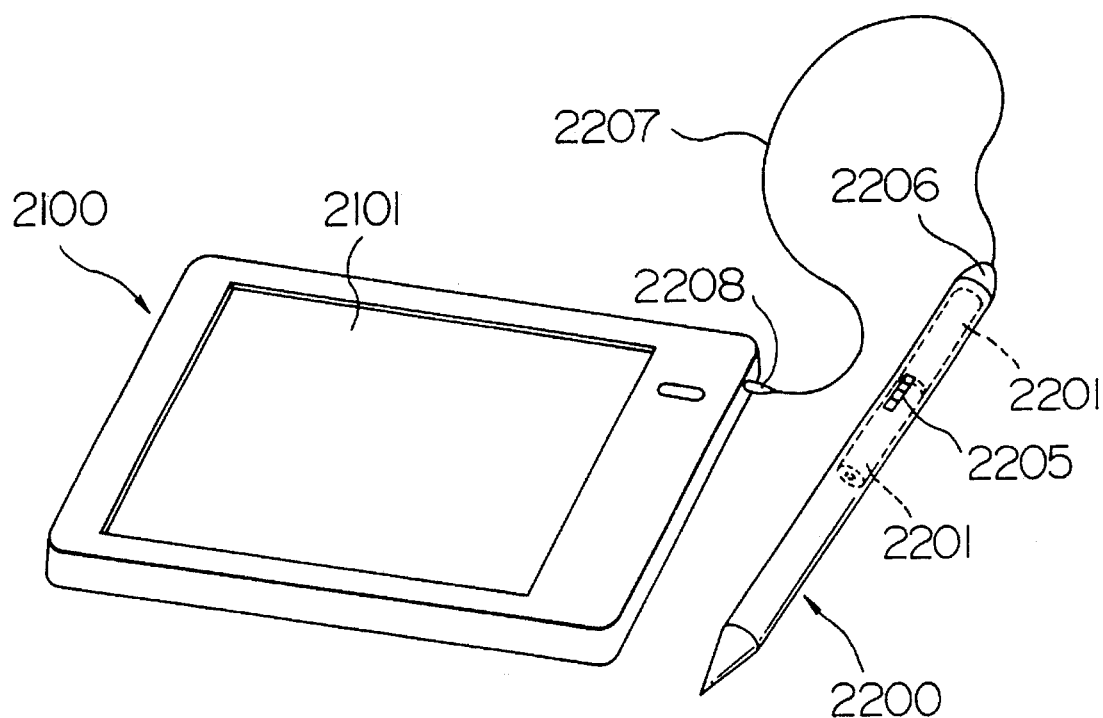
FIG. 12 is a view showing an outer appearance of a system for processing information according to a third embodiment of the present invention.

FIG. 12 is a view showing an outer appearance of the system for processing information (referred to as an information processing system).

The information processing system is composed of a pen 2200 and an information processing main unit 2100. The main unit 2100 provides a tablet 2101 integrally connected with a display. By giving an indication to the tablet 2101 with the pen 2200, the main unit 2100 is allowed to be handled. The pen 2200 is connected to the main unit 2100 through a connecting code 2107. In this embodiment, this pen 2200 provides a built-in battery 2201 for operating the main unit.

Figure 13:
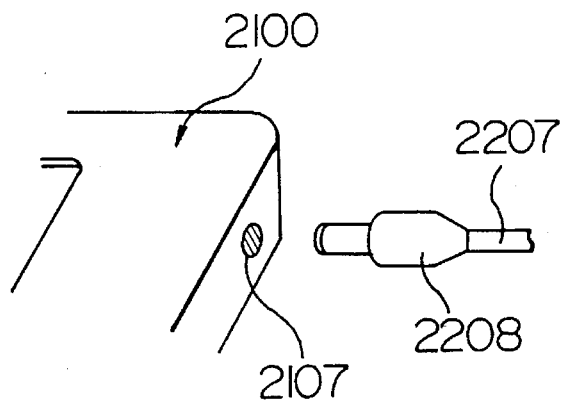
FIG. 13 is an expanded view showing a code connector provided in the information processing system according to the third embodiment of the present invention.

FIG. 13 is an expanded view showing a connecting portion between the pen 2200 and the main unit 2100. A connecting plug 2208 is provided at the end of the code 2107 extending from the end portion of the pen 200. By plugging this plug 2208 in the code connecting portion 2107 of the main unit 2100, the main unit 2100 is connected with the pen 2200.

Figure 14:
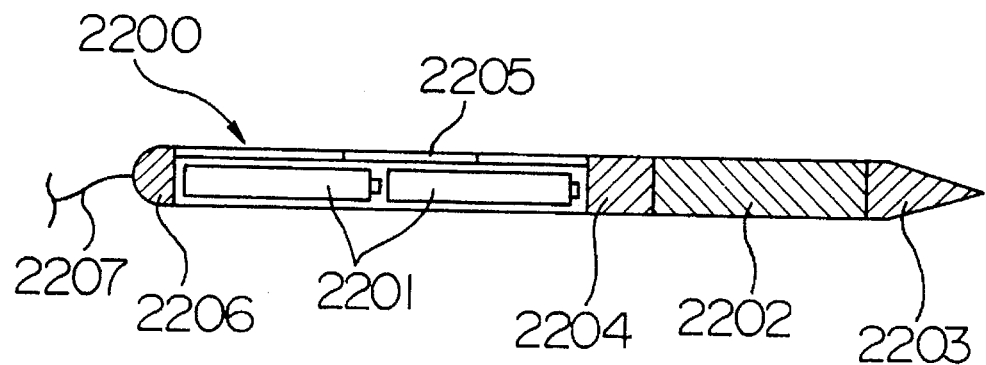
FIG. 14 is a sectional view showing a pen provided in the third embodiment of the present invention.

FIG. 14 shows a section of the pen 2200. The tablet 2101 is called as an electromagnetic induction type and is arranged to have a sensor on the surface. The sensor serves to sense an electromagnetic signal generated from a coil 2203 placed at the tip of the pen 2200 for inputting data. The pen 2200 is composed of the coil 2203 for generating the electromagnetic signal, a coil driving circuit 2202 for supplying an electric signal to the coil 2203, a battery 2201 serving as a power for driving the information processing system, a voltage sensing circuit 2204 for sensing a voltage of the battery 2201, and a panel 2205 for displaying a residual power of the battery, that is, the sensed result. The battery 2201 can be replaced by removing a cap 2207.

Figure 15:
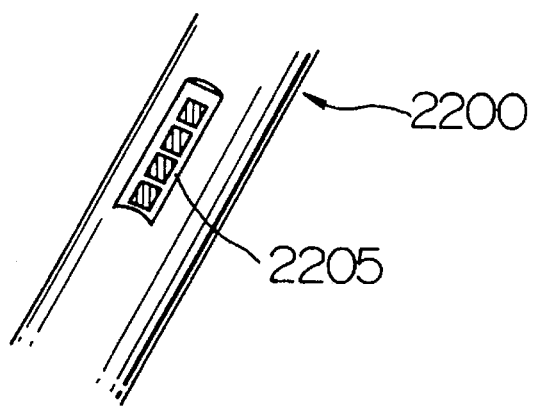
FIG. 15 is an expanded view showing a display of a state of the battery provided in the pen according to the third embodiment of the present invention.

An expanded view of the battery residual power display panel 2205 is shown in FIG. 15. A portion indicated by oblique lines of FIG. 15 indicates light-emitting diodes. When the diodes are operated, they indicate the voltage level of the battery 2201. As the voltage level of the battery 2201 is going down, the operated diodes are switched off one by one. From the panel 2205, the user can know how much the battery 2201 is consumed. In a case that, therefore, two or more pens 2200 are prepared and are changed one by one when it is used, before changing the pen, the user can know the state of the battery of the pen 2200 to be used next time. This results in preventing erroneous setting of the pen 2200 whose battery is exhausted. Since the method for sensing a voltage is executed by the prior art, the detailed description about the sensing method is left out.

FIG. 16 shows an internal arrangement of the portion related with the power of the information processing main unit 2100.

The information processing main unit 2100 provides a driving power control unit 2110, an operation and I/O processing unit 2102, and a storage-holding battery 2105 in addition to the tablet 2101 integrally connected with the display. The driving power control unit 2110 is arranged to have a voltage stabilizer circuit 2111 for smoothing and stabilizing a voltage inputted from the pen 2200, a voltage sensor circuit 2121 for outputting a binary logic of "High" (H level) and "Low" (L level) according to the input voltage from the pen 2200, and a switching circuit 2113 for electrically connecting the voltage stabilizer circuit 2122 with the operation and I/O-processing unit 2102 when the voltage sensor circuit 2112 outputs a H-level signal or electrically disconnecting both from each other when the circuit 2112 outputs an L-level signal. The operation and I/O processing unit has a state switching portion 2103 in addition to a storage portion (not shown) for storing data and a processing unit (not shown) for actually performing an operation. The operation of the state switching portion 2103 will be discussed below.

The voltage stabilizer circuit 2111 provided in the driving power control unit 2110 serves to generate a voltage required for operating the operation and I/O processing unit 2102 from an input voltage from the pen 2200 and feed the voltage to the operation and I/O processing unit 2102. The voltage sensor circuit 2112 monitors a voltage inputted from the pen 2200 and serves to output an L-level operation control signal 2125 to the switching circuit 2113 and the operation and I/O processing unit 2102 when the inputted voltage departs from the operative range of the operation and I/O processing unit 2102. When the L-level operation control signal 2125 is inputted to the c input of the switching circuit 2113, the switch is made open so that feeding a power from the voltage stabilizer circuit 2111 to the operation and I/O processing unit may be stopped. If the voltage inputted from the pen 2200 stays in the operative range of the operation and I/O processing unit 2102, the H-level operation control signal 2125 is outputted to the switching circuit 2113 and the operation and I/O processing unit 2102. When the L-level operation control signal 2125 is inputted to the c input of the switching circuit 2113, the switch is made closed so that the power may be fed from the voltage stabilizer circuit 2111 to the operation and I/O processing unit. When the connecting plug 2208 of the pen 2200 is removed from the main unit 2100, no power feed from the pen is inhibited. In this case, the operation control signal 2125 lowers to the L level through the effect of the grounding resistance 2108.

The operation and I/O processing unit 2102 controls various operations and I/O processes and performs some operations of processing an input from the pen 2200 and displaying the processed result.

The operation and I/O processing unit 2102 is in the "operative state" when the operation control signal 2125 is at the H-level potential and in the "waiting state" when the signal 2125 is at the L-level potential. In the "waiting state", the content of the memory and the state at the time point are held, while the operation or the I/O operation requiring a large power consumption is stopped and thus is not displayed. In case of shifting the "waiting state" to the "operative state" the operation is restarted immediately before shifting to the "waiting state". The process of switching the "operative state" to the "waiting state" is executed in the state switching portion 2103. This switching process is generally called as a resuming process. Since it is a well-known technique, the detailed description about the process is not left out.

In turn, the description will be oriented to the power feeding and the shift of the operative state in the information processing main unit 2100.

While the pen 2200 is feeding so high a voltage as keeping the main unit 2100 operative, the driving power control unit 2110 is feeding electric power to the operation and I/O processing unit 2102 through a diode 2106. During the time, the operation control signal 2125 is set to a H-level potential. As such, the operation and I/O processing unit 2102 keeps the "operative state".

If, on the other hand, the voltage inputted from the pen 2200 departs from the operative range of the main unit 2100, the driving power control unit 2110 stops to feed the electric power, when the operation control signal 2125 is set to an L-level potential. As such, the operation and I/O processing unit 2102 keeps the "operative state".

When the operation control signal 2125 lowers to the L-level potential, that is, feeding of operating power is stopped, the electric power from the storage-holding battery 2105 is fed to the operation and I/O processing unit 2102 through a diode 2104.

The state shift of the information processing main unit 2100 as described above may be summarized as follows.

1) When the power is properly fed from the pen 2200 to the main unit 2100, the main unit 2100 stays in the "operative state" and is operated by a battery 2201 built in the pen 2200.

2) When the main unit 2100 is disabled by lowering the power of the pen 2200 or feeding of an electric power from the pen 2200 is stopped, the main unit 2100 shifts to the "waiting state" in which the current content of the memory is maintained by the storage-holding battery 2105.

3) When the power feeding from the pen 2200 is re-started in the "waiting state" the main unit 2100 shifts to the "operative state" in which the main unit 2100 starts to continue the operation from the time point in the "waiting state".

As mentioned above, according to this embodiment, since the battery 2201 for driving the main unit 2100 is held inside of the pen 2200, the thickness of the main unit 2100 is not restricted by the size of the battery 2201. As such, the main unit 2100 is reduced in size In the "waiting state", what is required is just to feed the power required for keeping the state of re-starting the operation in the next "operative state" to be shifted. The volume of the storage-holding battery 2105 is smaller than that of the battery 2201 for driving the main unit 2100, which does not obstruct to reduce the main unit 2100 in size.

Moreover, in this embodiment, by connecting the pen 2200 with the main unit 2100, the operation is started. By removing the pen 2200 from the main unit 2100, the operation is terminated. This is an easy-to-understand handling system. If the battery is exhausted on the handling way, by replacing the pen 2200 with the battery 2201, the handling is allowed to be started immediately after the replacement. It means that the user can handle the system without having to be conscious of the state of the battery.

In the foregoing embodiment, the pen 2200 employs a battery-replaceable structure. It may employ a battery-irreplaceable structure. In this case, the battery 2201 is not replaced. If the battery 2202 is exhausted, the pen itself cannot be used. Hence, it goes without saying that the pen 200 can be thrown away. Further, the battery itself may be chargeable.

According to the present invention, the user can enjoy the similar handling environment if he or she can use his or her own coordinates indicator (electronic pen) for any coordinates sensing device (main unit).

Further, if two or more users use the same coordinates sensing device (main unit) substantially at the same time, it is possible to keep a high character recognition ratio.

As compared with the system in which the individual information being stored in an external storage medium like an IC card, it is possible to eliminate the handling step of mounting the external storage medium to the main unit and leave the individual information in the main unit.

According to the present invention, the battery for driving the main unit is built in the coordinates indicating device so that the battery may feed electric power to the main unit. This arrangement is smaller than that in which the battery is built only in the main unit.

What is claimed is:

1. An information processing system arranged to have a coordinates indicating device and a main unit of said information processing system having a coordinates sensing means for sensing a coordinates indicated by said coordinates indicating device, processing means for doing a process based on the sensed result of said coordinates sensing means and display means for displaying the processed result of said processing means, wherein said coordinates indicating device has a battery for driving at least said main unit, and includes a cord through which an electric power is supplied from said battery to said main unit.

2. An information processing system according to claim 1, wherein said coordinates detecting means and said display means are formed in one body.

3. An information processing system according to claim 1, wherein said coordinates indicating device includes voltage sensing means for sensing whether or not the voltage of said electric power fed from said coordinates indicating device is an operative voltage of the main body of said information processing system, and state switching means for switching the function of the main unit of said system to an operative state when said voltage sensing means senses that the voltage of the fed power is an operative voltage of the main unit of said system or stopping the function of the main unit of said system when said voltage sensing means senses that the voltage of the fed power is an inoperative voltage of the main unit of said system.

4. An information processing system according to claim 1, further comprising:

processing means for executing a function of the main unit of said system;

storage means for storing information;

voltage sensing means for sensing whether or not the voltage of power fed from said coordinate indicating device stays in the range of an operative voltage for said processing means;

power cut-off means for feeding power from said coordinates indicating device to said processing means and said storage means when said voltage sensing means senses that the voltage of said fed power stays in the range of an operative voltage for said processing means or cutting off power fed from said coordinates indicating device to said processing means and said storage means when said voltage sensing means senses that the voltage of said fed power is an inoperative voltage of said information processing system;

state switching means for switching the state of said processing means to an operative state when said voltage sensing means senses that the voltage of said fed power stays in the range of an operative voltage for said processing means or stopping the operation of said processing means and storing the content of the operation immediately before the operation of said processing means is stopped in said storage means; and a storage-holding battery for feeding power to said storage means if power from said coordinates indicating means is interrupted.

5. An information processing system according to claim 1, wherein said electronic pen further has a display unit for indicating residual power of said battery.

6. An information processing system including an electronic pen and a main unit of said information processing system having a tablet for detecting coordinates and/or locus indicated by said electronic pen, processing means for doing a predetermined process on the basis of said coordinates and/or locus detected by said tablet and display means for displaying the processed result of said processing means, wherein said electronic pen has a battery for driving at least said main unit, and is capable of electrically connecting to said main unit via a cord for supplying an electric power from said battery to said main unit.

7. An information processing system according to claim 6, wherein said tablet also has the function of said display means.

8. An information processing system according to claim 6, wherein said electronic pen further has a display unit for indicating residual power of said battery.

9. An information processing system including an electronic pen and a main unit of said information processing system having a tablet for detecting coordinates and/or locus indicated by said electronic pen, processing means for doing a predetermined process on the basis of said coordinates and/or locus detected by said tablet and display means for displaying the processed result of said processing means, wherein said electronic pen contains a battery for driving said main unit and has a display unit for indicating residual power of said battery, and is capable of electrically connecting to said main unit via a cord for supplying an electric power from said battery to said main unit, said main unit is supplied with the electric power from said battery contained in said electric pen via said cord, and said main unit further includes a power control unit which controls at least operation of said processing means by using the electric power supplied from said battery contained in said electronic pen.

10. An information processing system including an electronic pen and a main unit of said information processing system having a tablet for detecting coordinates and/or locus indicated by said electric pen, processing means for doing a predetermined process on the basis of said coordinates and/or locus detected by said tablet and display means for displaying a processed result of said processing means, wherein said electronic pen includes rewritable memory means for storing a proper information concerning a user of said electronic pen and information concerning the processed result of said processing means transmitted from said main unit to the electronic pen and output means for outputting said proper information stored in said memory means to said main unit, said processing means doing said predetermined process in accordance with said proper information outputted from said output means.

11. An information processing system according to claim 10, wherein said electronic pen provides a battery built therein, and further comprising power control means for operating a function of a main unit of said system with power being fed from said battery, and a connecting code for electrically connecting said electronic pen with the main unit of said system in a manner to feed power from said battery provided inside of said electronic pen to said power control means provided in the main unit of said system.

12. An information processing system according to claim 11, wherein said coordinates indicating device includes first voltage means for sensing an electric potential of aid battery and voltage display means for displaying a voltage sensed by said first voltage sensing means.

13. An information processing system according to claim 11, wherein said electronic pen includes second voltage sensing means for sensing whether or not the voltage of said electric power fed from said electronic pen is an operative voltage of the main body of said information processing system, and state switching means for switching the function of the main unit of said system to an operative state when said second voltage sensing means senses that the voltage of the fed power is an operative voltage of the main unit of said system or stopping the function of the main unit of said system when said second voltage sensing means senses that the voltage of the fed power is an inoperative voltage of the main unit of said system.

14. An information processing system according to claim 11, further comprising:

processing means for executing a function of the main unit of said system;

storage means for storing information;

second voltage sensing means for sensing whether or not the voltage of power fed from said coordinate indicating device stays in the range of an operative voltage for said processing means;

power cut-off means for feeding power from said coordinates indicating device to said processing means and said storage means when said second voltage sensing means senses that the voltage of said fed power stays in the range of an operative voltage for said processing means or cutting off power fed from said coordinates indicating device to said processing means and said storage means when said second voltage sensing means senses that the voltage of said fed power is an inoperative voltage of said information processing system;

state switching means for switching the state of said processing means to an operative state when said second voltage sensing means senses that the voltage of said fed power stays in the range of an operative voltage for said processing means or stopping the operation of said processing means and storing the content of the operation immediately before the operation of said processing means is stopped in said storage means; and a storage-holding battery for feeding power to said storage means if power from said coordinates indicating means is interrupted.

15. An information processing system according to claim 11, wherein said coordinates indicating device provides an opening formed for plugging said battery in or out of the inside of said device and a removable cap on said opening.

16. An information processing system having a tablet for detecting coordinates and/or locus indicated by an electronic pen, processing means for doing a predetermined process on the basis of said coordinates and/or locus detected by said tablet and display means for displaying the processed result of said processing means, comprising:

(a) a cord connecting unit connecting a cord for electrically connecting to said electronic pen and supplied with an electric power from a battery contained in said electronic pen via said cord; and (b) a power control unit which controls at least operation of said processing means by using the electric power supplied to said cord connecting unit.

17. An electronic pen used for a hand writing input device, for inputting coordinates and/or locus on a tablet of said hand writing input device, wherein said electronic pen has a battery for driving at least said handwriting input device, and said electronic pen includes a cord for supplying electric power from said battery to said hand writing input device.

18. An electronic pen according to claim 17, wherein said coordinates indicating device includes first voltage means for sensing an electric potential of said battery and voltage display means for displaying a voltage sensed by said first voltage sensing means.

19. An electronic pen according to claim 17, wherein said coordinates indicating device provides an opening formed for plugging said battery in or out of the inside of said device and a removable cap on said opening.

20. An electronic pen, used for a hand writing input device, for inputting coordinates and/or locus on a tablet of said hand writing input device, comprising:

at least one rewritable memory means for storing a proper information concerning a user of said electronic pen and/or identification information proper to said electronic pen, said information being transmitted from said handwriting input device to the electronic pen; and output means for outputting said information stored in said rewritable memory means to said hand writing input device.

21. An information processing system comprising:

a coordinates indicating device and a coordinates sensing device composed of coordinates sensing means for sensing a point of coordinates indicated by said coordinates indicating device, processing means for performing a process based on said sensed result, and display means for displaying the processed result, comprising:

said coordinates indicating device having first storage means for storing information and first output means for outputting information stored in said first storage means;

a coordinates sensing device, which is capable of being coupled with and separated from said coordinates indicating device, having second storage means including a rewritable memory means for storing information containing the processed result and second output means for outputting information stored in said second storage means;

said first storage means of said coordinates indicating device further storing information outputted from said second output means of said coordinates sensing device;

said second storage means of said coordinates sensing device further storing information outputted from said first output means of said coordinates indicating device; and wherein said processed result is proper information required for indicating an operation done by said coordinates indicating device for each of said coordinates indicating devices, said first output means further outputs the proper information stored in said first storage means, and said processing means performs a process based on the proper information outputted from said first output means.

22. An information processing system according to claim 21, wherein said second storage means further stores common information to the operation to be done by all the coordinates indicating devices and said processing means performs the process based on the proper information outputted from said first output means and said common information stored in said second storage means.

23. An information processing system comprising:

one or more coordinates indicating devices and a coordinates sensing device composed of coordinates sensing means for sensing a coordinates indicated by said coordinates indicating device, processing means for doing a process based on the sensed result, and display means for displaying the processed result;

said coordinates indicating device, which is capable of being coupled with and separated from said coordinates sensing device, having first storage means for storing a device identifier given to said coordinates indicating device and first output means for outputting the device identifier stored in said first storage means;

said coordinates sensing device having second storage means for storing a combination of said device identifier outputted from said first output means and a processed result obtained by said processing means in response to an indication of the coordinates indicating device which outputted said device identifier, and second output means for outputting the device identifier and the processed result stored in said second storage means;

said first storage means including a rewritable memory means for storing the processed result outputted from said second output means in the event that the device identifier outputted from said second output means is equal to the device identifier stored in said first storage means; and wherein said coordinates indicating device having state sensing means for sensing whether or not said coordinates indicating device is in the coordinates indicating state, said first output means starts to operate at a time when said state sensing means starts to sense that the device is the coordinates indicating state or senses that the device is not the coordinates indicating state, and said second output means starts to operate at a time when said coordinates sensing means starts to sense a point of coordinates.

24. An electronic pen, used for a processing device for processing a handwriting input information for inputting coordinates and/or locus on a surface of said processing device capable of inputting said handwriting information, wherein said electronic pen has a battery for driving said processing device, a display unit for indicating residual power of said battery and a cord for supplying electric power from said battery to said processing device.

* * * * *